United States Patent [19]

Gaskin

[11] 4,013,301
[45] Mar. 22, 1977

[54] VEHICLE STEERING MECHANISMS

[75] Inventor: Graham Edward Gaskin, Ipswich, England

[73] Assignee: Ransomes Sims & Jefferies Limited, Ipswich, England

[22] Filed: Feb. 20, 1975

[21] Appl. No.: 551,242

Related U.S. Application Data

[63] Continuation-in-part of Ser. No. 400,544, Sept. 25, 1973, abandoned.

[30] Foreign Application Priority Data

Jan. 14, 1975 United Kingdom .............. 1599/75

[52] U.S. Cl. .......................... 280/95 R; 74/484 R
[51] Int. Cl.² .......................................... B62D 3/02
[58] Field of Search ............ 280/93, 95 R, 94, 103; 74/432, 484 R

[56] References Cited

UNITED STATES PATENTS

| | | | |
|---|---|---|---|
| 1,069,810 | 8/1913 | Riemer | 280/93 |
| 1,461,965 | 7/1923 | Bolte | 280/93 |
| 1,915,816 | 6/1933 | Cole | 280/95 R |
| 2,411,570 | 11/1946 | Hawkins | 280/95 R X |
| 2,728,586 | 12/1955 | Wildhaber | 280/95 R X |
| 2,916,294 | 12/1959 | Quayle | 280/93 |
| 3,059,944 | 10/1962 | Goodacre | 280/95 R |
| 3,154,316 | 10/1964 | Göhmann | 280/103 |
| 3,239,025 | 3/1966 | Schreck | 280/93 X |
| 3,534,825 | 10/1970 | Reffle | 280/93 |
| 3,575,254 | 4/1971 | Sipos | 280/95 R |

Primary Examiner—Robert R. Song
Assistant Examiner—John P. Silverstrim
Attorney, Agent, or Firm—Browdy and Neimark

[57] ABSTRACT

A vehicle steering mechanism for steering two ground engaging wheels of an industrial vehicle, comprises for each ground engaging wheel, an upright shaft rotation of which effects rotation of the associated ground engaging wheel, a track rod system connected with each upright shaft and including an arm mounted on the axle casing and rotatable about an upright axis and first and second complementary co-operating reduction drive elements of which the first element is rotatable about the same axis as the arm and upon rotational movement about that axis of the arm whilst the second element is mounted upon the corresponding upright shaft to effect rotation of that shaft upon rotational movement about its axis of the arm, and, link means 50 interconnecting the arm of each track rod system as to cause on rotation of the arms about their respective axes a differential rotation of the upright shafts and therefore, in operation, of the ground engaging wheels to an extent such that as the arms rotate from a position in which the wheels are parallel the center of rotation about which both wheels turn moves along a line parallel with and spaced from a line joining the upright shaft of each wheel, the rotation of the arms causing through the reduction drive elements an angular displacement of the wheels through a larger angle than the angle of movement of the arms.

10 Claims, 7 Drawing Figures

VEHICLE STEERING MECHANISMS

This application is a Continuation-in-Part of copending application Ser. No. 400,544, filed Sept. 25, 1973, now abandoned.

This invention relates to a vehicle steering mechanism for steering two ground engaging wheels of an industrial vehicle. It is important in industrial vehicles, for example, fork lift trucks, to provide steering mechanism which affords the vehicle maximum maneuverability by enabling the vehicle to turn in a very small turning circle.

The present invention consists in a vehicle steering mechanism for steering two ground engaging wheels of an industrial vehicle, comprising for each ground engaging wheel, an upright shaft rotation of which effects rotation of the associated ground engaging wheel, a track rod system connected with each upright shaft and including an arm mounted on the axle causing rotatable about an upright axis and first and second complementary co-operating reduction drive elements of which the first element is rotatable about the same axis as the arm and upon rotational movement about that axis of the arm whilst the second element is mounted upon the corresponding upright shaft to effect rotation of that shaft upon rotational movement about its axis of the arm, and, link means so interconnecting the arm of each track rod system as to cause on rotation of the arms about their respective axes a differential rotation of the upright shafts and therefore, in operation, of the ground engaging wheels to an extent such that as the arms rotate from a position in which the wheels are parallel the centre of rotation about which both wheels turn moves along a line parallel with and spaced from a line joining the upright shaft of each wheel, the rotation of the arms causing through the reduction drive elements an angular displacement of the wheels through a larger angle than the angle of movement of the arms.

Suitably, the first and second complementary co-operating reduction drive elements are gears. The first element is a quadrant gear having twice the radius of the gear comprising the second element.

Preferably, the link means comprises a link pivotally mounted on the axle about an upright axis and co-operable with the arm of one of the track rod systems, the link being pivotally connected by a track connecting rod to the arm of the other track rod system.

The invention will now be described by way of example with reference to the accompanying drawings, in which.

Figure 3:
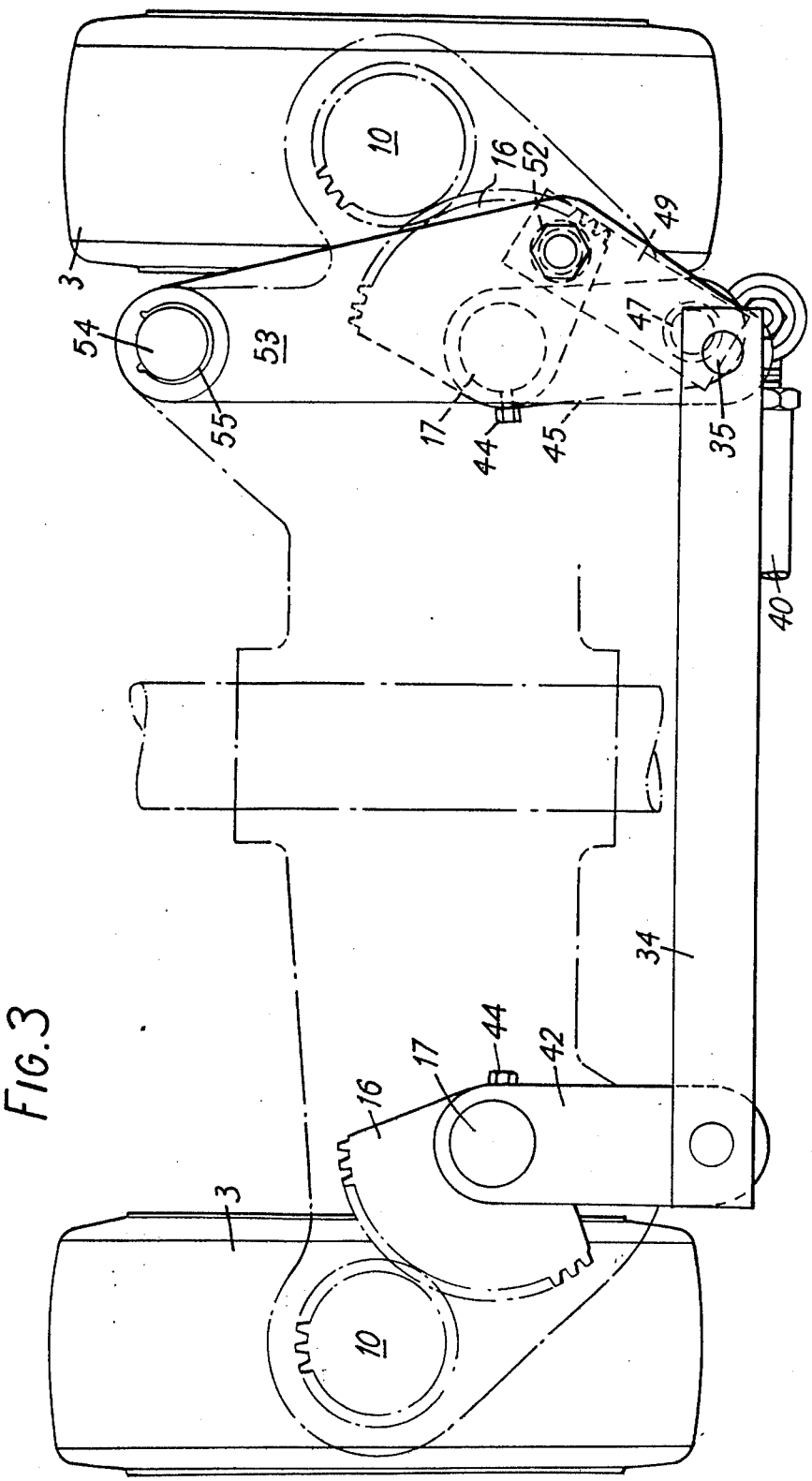
FIG. 3 is a plan view of a second vehicle steering mechanism in accordance with the invention for steering two ground engaging wheels of an industrial vehicle, suitably a reach truck.
Figure 4:
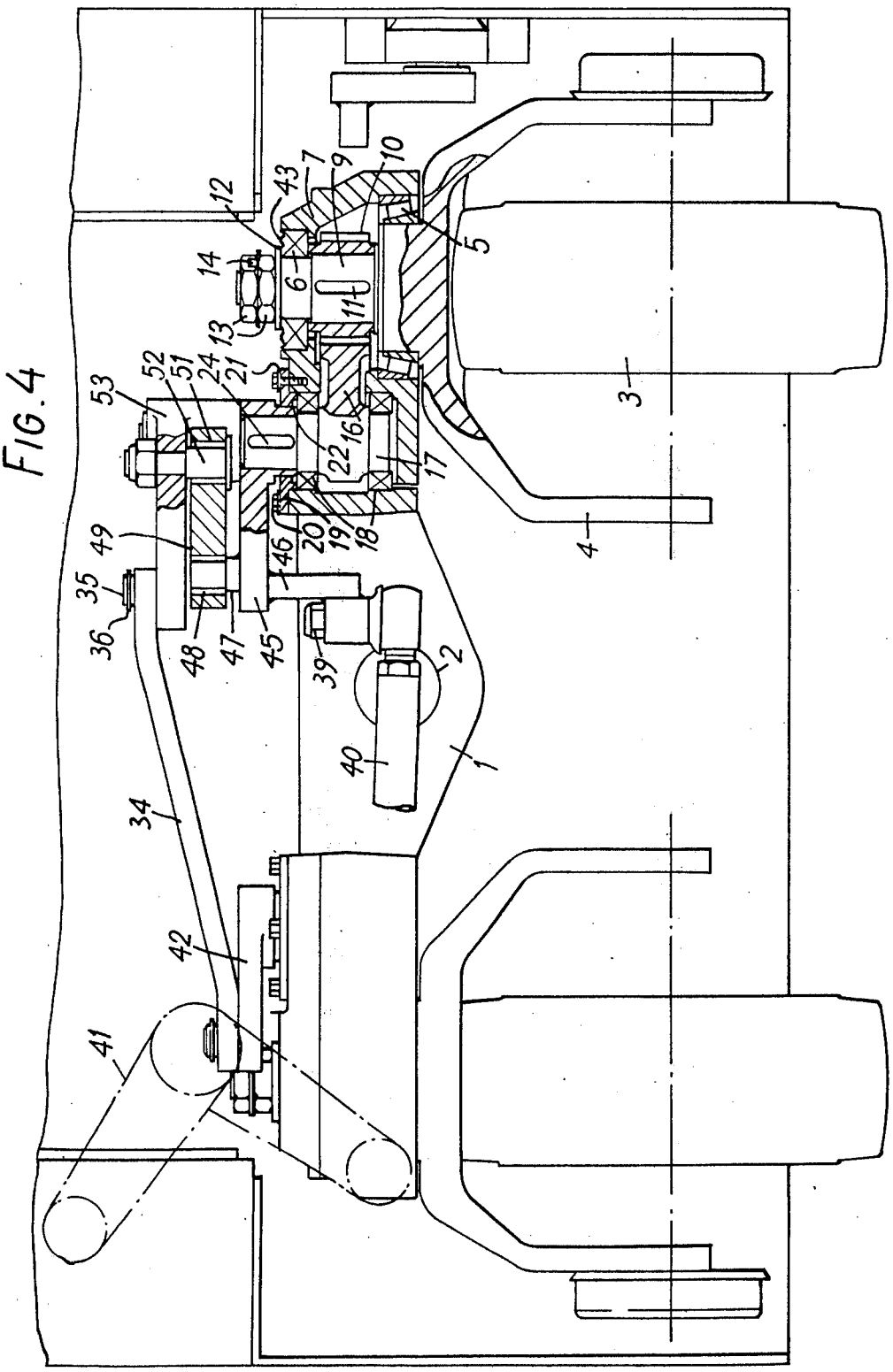
FIG. 4 is an elevation partly in section of the mechanism of FIG. 3.
Figure 5C:
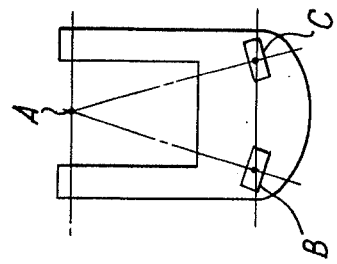
Figure 5B:
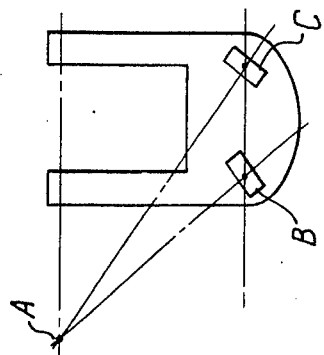
Figure 5A:
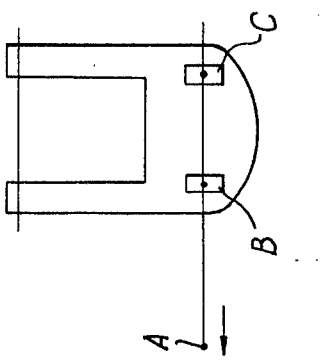

FIGS. 5(a) to (c) are diagrammatic plan views of a reach truck according to either FIGS. 1 and 2 or FIGS. 3 and 4 showing the steering wheels in different positions.

The mechanisms illustrated in the drawings both provide for the steering of ground engaging wheels of a reach truck through a minimum angle of lock of 180°.

Figure 1:
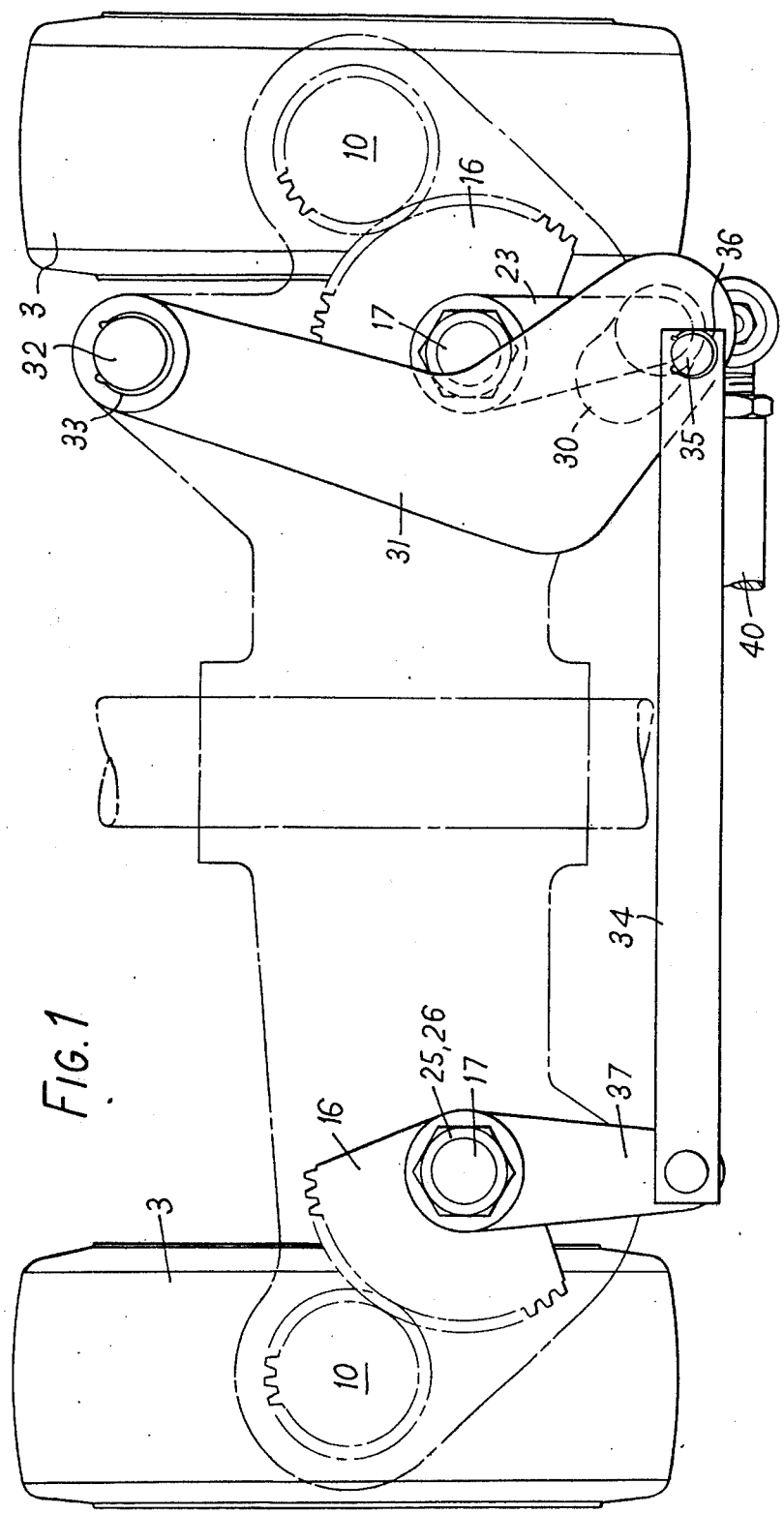
FIG. 1 is a plan view of one vehicle steering mechanism in accordance with the invention for steering two ground engaging wheels of an industrial vehicle, suitably a reach truck.
Figure 2:
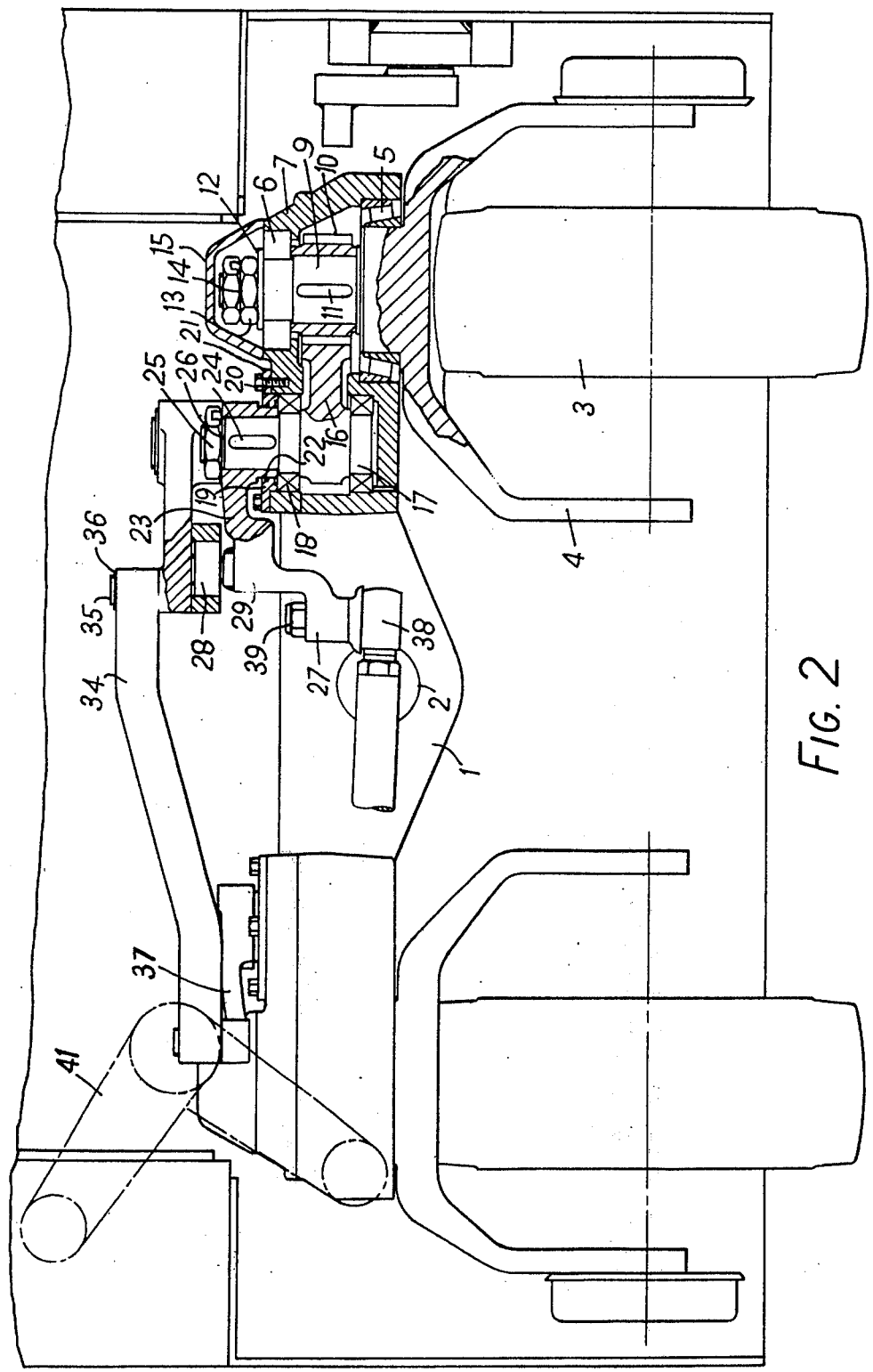
FIG. 2 is an elevation partly in section of the mechanism of FIG. 1.

Referring to FIGS. 1 and 2 of the drawings, a steering axle assembly comprises a cast or fabricated axle 1 which is articulated about a horizontal pivot shaft 2 extending longitudinally of the vehicle there being between the axle and the shaft 2 flexible rubber mountings (not shown). The shaft 2 is mounted on and forms part of the main frame of the vehicle. Two ground engaging drive wheels of the vehicle are each pivotally connected to the ends of the axle 1 by means of a stirrup 4 formed above the wheel with a substantially vertical stub shaft 9 mounted in tapered roller bearings 5 and 6. Bearing 5 is located in a downwardly facing recess in the axle whilst bearing 6 is coaxial with bearing 5 and located in cover portion 7 of the axle wheel is secured by bolts or studs to the axle.

Clamped between the bearings 5 and 6 is a gear pinion 10 secured to stub shaft 9 by means of a feather key 11. Clamping between bearings 5 and 6 is accomplished by a washer 12 two locking nuts 13 and a tab washer 14. Dirt and other foreign matter is excluded from the bearings 5 and 6 by a cap 15 which fits over the cover 7.

The pinion gear 10 is driven by a quadrant gear 16 whose spindle 17 is pivotally mounted parallel with and at a fixed distance from the stub shaft 9 on the stirrup 4. The quadrant gear 16 and spindle 17 are mounted in a pair of coaxial bearings 18 carried respectively in the axle casing 1 and the cover 7 on opposite sides of the quadrant gear 16. The upper bearing 18 is retained in the axle 1 by a cap 18 secured by screws 20 and lock washers 21 to the axle casing. An O ring or similar seal 22 contained in a groove of the cap 19 prevents loss of lubricant from and ingress of dirt to the bearings 18 and also the bearings 5 and 6.

The upper part of the spindle 17 projects from the cover 19 and has an arm 23 (in the case of the right hand wheel and 37 in the case of the left hand wheel) non-rotatably secured to it by a key 24. The lever 23 is secured to the spindle 17 by a nut 25 and tab washer 26.

The arm 23 (but not the arm 37) has steps 27 and 29 formed in it the topmost step 29 of which having mounted thereon a cam follower 28 which is rotatable about an axis parallel with the axis of the spindle 17.

The cam follower 28 engages with and rotates in a cam profile in the form of a curved slot 30 formed in a cranked cam lever 31 which is pivoted on the axle 1 for rotation about a vertical axis by means of pivot pin 32. The axis of the pin 32 and arm 23 lie on a line parallel and spaced transversely from the longitudinal axis of the vehicle. The lever 31 is retained by a circlip 33. Pivotally connected to the lever 31 at a point more remote from the pivot pin 32 than the centre of the cam follower 28 when the latter is at the end of the slot 30 further away from pin 32 is a connecting rod 34, the rod 34 being secured to its pivot 35 by a circlip 36. The end of the connecting rod 34 remote from the cam lever 31 is pivotally connected to the arm 37 of the track rod system of the left hand wheel.

The end of step 27 of arm 23 connects by way of a universal joint 38 with connecting rod 40 and bell crank lever 41 to the drop arm of the vehicle steering gear reduction box. Universal joint 38 is rotatably mounted about a substantially vertical axis the joint 38 being secured by a self-locking nut 39 to the step 27.

The vertical axis of rotation of the joint 38 is spaced on the side of the axis of the cam follower 28 remote from the spindle 17, the axis of spindle 17, cam follower 28 and the universal joint 38 being contained in the same vertical plane.

In operation in order to steer the wheels 3 to the right rotation of the vehicle steering wheel is effected so as to apply a force to the connecting rod 40 pulling it to the left. This causes the arms 23 and 37 to rotate clockwise so that the wheels 3 are rotated in an anti-clockwise sense. The effect of the cam and follower is to cause lever 31 to move through connecting rod 34 the arm 37 to a lesser extent than the arm 23 is moved with the result that the right hand wheel turns through a greater angle than the left hand wheel and the vehicle therefore turns to the right. It will be apparent that as the arm 23 is rotated clockwise the cam follower 28 tends to ride along the slot 30 and accordingly causes the lever 31 to impart to the arm 37 a lesser rotation than would be the case were the axis of the follower 28 fixed relative to the lever 31. Accordingly the left hand wheel is rotated through a smaller angle than the right hand wheel and the vehicle is on right hand lock.

To put the vehicle on left hand lock the driver operates the steering wheel to impart a force moving connecting rod 40 to the right. This moves the arms 27 and 37 anti-clockwise but the movement of the cam follower 28 causes movement of the cam lever such that the arm 37 moves through a greater angle than the arm 23. Thus the left hand wheel is rotated through a greater angle in a clockwise sense than does the right hand wheel and the vehicle accordingly progresses on left hand lock. It will be noted that the quadrant gear 16 and pinion 10 form at each wheel reduction elements which have the effect of causing the rotation of the wheels to exceed the rotation of the associated arm 23 or 37. In the illustrated mechanism the quadrant 16 has twice the radius of the pinion 10 with the result that, bearing in mind the effect of arm 31, cam slot 30 and follower 28, in proceeding from full left hand to full right hand lock each wheel turns through an angle slightly greater than 180°.

The overall effect of the operation of the mechanism described is illustrated in FIGS. 5(a) to (c) and particularly FIGS. 5(b) and (c). The steering wheels 3 are shown at B and C and the point about which wheels B and C turn is illustrated at A which point is located on lines normal to the upright axes of rotation of wheels B and C. FIG. 5(a) shows wheels A and B positioned for steering the truck along a straight line when point A is an infinite distance along the line joining the upright axes of wheels B and C. In FIGS. 5(b) and 5(c) it will be seen that the turning centre A is located on a line parallel with and spaced a fixed distance from the line through the upright rotational axes of wheels B and C. FIG. 5(c) is the representation of full lock whilst FIG. (b) represents any value of intermediate lock. Thus the mechanism described in relation to FIGS. 1 and 2 provides a tracking system in which over a substantial part indeed almost the whole of the lock of the truck the centre A lies on a line spaced from and parallel with the line joining the upright axes of the steering wheels. This geometry provides desirable tracking. It should be noted that the line on which the centre A lies at intermediate and full lock is spaced in the embodiment described at the wheel base of the vehicle. It could however be spaced at a greater or lesser spacing than the wheel base from the line joining the upright axes of the steering wheels.

In the mechanism shown in FIGS. 3 and 4 parts which correspond to those of the embodiment of FIGS. 1 and 2 are given the same reference numerals as in FIGS. 1 and 2 and will not be described again in detail. The mechanism has in common with that of FIGS. 1 and 2 an axle 1 pivotable on a shaft 2 and at each end of the axle 2 a stirrup 4 formed with a stub shaft 9 mounted in roller bearings 5 and 6. An annular sealing ring 43 is provided in place of cap 15 of FIG. 1 and excludes dirt and other foreign matter from the bearings. A gear pinion 10 is mounted on each stub shaft 9 and meshes with a quadrant gear 16 having a spindle 17 parallel to shaft 9. Spindle 17 of the left-hand wheel has in place of the arm 37 of FIG. 1 an arm 42 secured to it by a key (not shown) and by a nut 44 which extends through a threaded hole in arm 42 into engagement with the spindle, whilst in place of arm 23 of FIG. 1 an arm 45 is provided on the spindle 17 of the right-hand wheel and is also non-rotatably secured to its spindle 17 by a key 24 and a nut 47. The arm 45 has a single step 46 formed in it and has adjacent to step 46 an upstanding pivot pin 47 which carries a needle roller bearing 48, one end of a link 49 being rotatable in bearing 48 about pivot pin 47. The other end of the link is rotatable in a needle roller bearing 51 about a pivot pin 52 depending from a further link in the form of a lever 53 which is pivoted in a pivot pin 54 on the axle 1 for rotation about a vertical axis. The lever 53 is retained on pivot pin 54 by a circlip 55. Pivotally connected to the lever 53 at a point more remote from the pivot pin 54 than the depending pivot pin 52 is a track connecting rod 34 which is secured to its pivot 35 by a circlip 36, the end of the connecting rod remote from the lever 53 being pivotally connected to the arm 42 of the track rod system of the left-hand wheel. Lever 53 is so located on the axle that in the position in which the wheels 3 are parallel its pivot pin 54 on the axle and pivot 35 of the track connecting rod are joined by a line parallel to the wheels and intersecting the axis of arm spindle 17, whilst pivot pin 52 is so located on the lever as to be spaced to the right of this line.

The end of step 46 of arm 45 connects by way of a universal joint 38 with connecting rod 40 and bell crank lever 41 to the drop arm of the vehicle steering gear reduction box. Universal joint 38 is rotatably mounted about a substantially vertical axis, the joint 38 being secured by a self-locking nut 39 to the step 46. The vertical axis of rotation of the joint 38 is spaced on the side of the axis of depending pivot pin 52 remote from the spindle 17.

In operation in order to steer the wheels 3 to the right rotation of the vehicle steering wheel is effected so as to apply a force to the connecting rod 40 pulling it to the left. This causes the arms 45 and 42 to rotate clockwise so that the wheels 3 are rotated in an anti-clockwise sense. The effect of the link 49 is to cause lever 53 to move through connecting rod 34 the arm 42 to a lesser extent than the arm 45 is moved with the result that the right hand wheel turns through a greater angle than the left hand wheel as the vehicle turns to the right. It will be apparent that as the arm 45 is rotated clockwise spindle 17 and pivot pin 52 depending from lever 53 move towards one another, decreasing the angle between arm 45 and link 49 and hence the rotation of lever 53 about pivot pin 54. Movement of arm 45 to the left thus imparts a lesser rotation to arm 42 than would be the case if connecting rod 34 were connected directly to the upstanding pivot pin 47 of arm 45. Accordingly the left hand wheel is rotated through a smaller angle than the right hand wheel and the vehicle is on right hand lock.

To steer the vehicle to the left the driver operates the steering wheel to impart a force moving connecting rod 40 to the right. This moves the arms 45 and 42 anticlockwise but the distance between spindle 17 and pivot pin 52 and hence the angle between arm 45 and link 49 increases and accordingly movement of arm 45 causes a movement of lever 53 such that the arm 42 moves through a greater angle than the arm 45. Thus the left hand wheel is rotated through a greater angle in a clockwise sense than is the right hand wheel and the vehicle accordingly progresses on left hand lock. As in the embodiment of FIGS. 1 and 2 the quadrant gear 16 and pinion 10 form at each wheel reduction gear elements which have the effect of causing the rotation of the wheels to exceed the rotation of the associated arm 45 or 42. In the illustrated mechanism the quadrant 16 has twice the radius of the pinion 10 with the result that, bearing in mind the effect of lever 53 and link 49, in proceeding from full left hand to full right hand lock each wheel turns through an angle slightly greater than 180°.

The overall effect of the operation of the above mechanism is similar to that of FIGS. 1 and 2, which has been described with reference to FIGS. 5(a) to (c) and particularly FIGS. 5(b) and (c).

I claim:

1. A vehicle steering mechanism for an industrial vehicle, comprising:
   first and second ground engaging wheels;
   an axle on which said ground engaging wheels are mounted;
   first and second upright shafts respectively for said ground engaging wheels, the rotation of each shaft effecting rotation of the associated ground engaging wheel;
   first and second track rod systems connected respectively with said shafts, each track rod system including an arm mounted on said axle and rotatable about an upright axis;
   first and second complementary cooperating reduction drive elements of which the first element is rotatable about the same axis as the corresponding arm and upon rotational movement about said axis of that arm, whilst the second element is mounted upon the corresponding upright shaft to effect rotation of that shaft upon rotational movement of said arm about its axis, the rotation of said arms causing through the reduction drive elements an angular displacement of said wheels through a larger angle than the angle of movement of said arms;
   means for rotating one of said arms of said first and second track rod systems to effect steering of said ground engaging wheels; a rigid and inextensible link member pivotally mounted on said axle about an upright pivot axis and coupled with said arm of said first track rod system; and
   a track connecting rod having pivotal connections with said link member and with said arm of said second track rod system, said pivotal connections being spaced apart substantially by the distance between the axis of said arms of said track rod systems, said link member being located adjacent to and in relation to said first track rod system that in the position in which said ground engaging wheels are parallel its pivot axis and pivotal connection with said track connecting rod are joined by a line substantially parallel to said wheels, whereby upon operation of said means for rotating one of said arms rotation of both said arms about their respective axes and a differential rotation of said upright shafts is effected and said ground engaging wheels are rotated differentially to an extent such that as said arms rotate from said position in which said wheels are parallel the instantaneous center of rotation about which both wheels turn moves along a turning center line parallel with and spaced from a line joining said shafts of said wheels.

2. A vehicle steering mechanism as claimed in claim 1, wherein the first and second complementary cooperating reduction drive element are gears.

3. A vehicle steering mechanism as claimed in claim 2, wherein the said first element is a quadrant gear having twice the radius of the gear comprising the second element.

4. A vehicle steering mechanism as claimed in claim 1, wherein said link member is coupled to said arm of said first track rod system by a cam and cam follower.

5. A vehicle steering mechanism as claimed in claim 4, wherein said link member is so located in relation to said first track rod system that in said position in which said ground engaging wheels are parallel said line substantially parallel to the wheels and joining the pivotal axis of said link member and its pivotal connection with said track connecting rod intersects the arm axis of said first track rod system.

6. A vehicle steering mechanism as claimed in claim 1, wherein said turning center line is spaced from said line joining said shafts of said wheels by an amount equal to the vehicle wheel base.

7. A vehicle steering mechanism as claimed in claim 1, wherein a further link member is pivotally connected to said link member and to said arm of said first track rod system said further link member being substantially shorter than said link member, whereby on rotation of said arms of said first and second track rod systems relative angular movement of said further link member with respect to said link member is afforded thereby to impart a differential rotation to said arms.

8. A vehicle steering mechanism as claimed in claim 7, wherein the pivotal connection of said further link member with said link member is substantially closer to the pivot mounting of said link member on said axle than is the pivotal connection of said track connecting rod with said link member.

9. A vehicle steering mechanism as claimed in claim 8, wherein said link member is so located in relation to said first track rod system that in said position in which said ground engaging wheels are parallel said line substantially parallel to the wheels and joining the pivotal axis of said link member and its pivotal connection with said track connecting rod intersects the arm axis of said first track rod system.

10. A vehicle steering mechanism as claimed in claim 9, wherein the pivotal connection of said further link member with said link member is spaced from said line substantially parallel to the wheels on the side of said line remote from the second track rod system.

* * * * *